United States Patent Office 3,317,621
Patented May 2, 1967

3,317,621
PREPARATION OF METHYL INDANES
Edwin L. De Young, Chicago, Ill., assignor to Universal Oil Products Company, Des Plaines, Ill., a corporation of Delaware
No Drawing. Filed June 8, 1964, Ser. No. 373,548
7 Claims. (Cl. 260—668)

This invention relates to a process for preparing intermediates which are useful in the preparation of many chemical intermediates. More particularly, the invention is concerned with a process for preparing methyl indanes which are useful as components in rocket or jet fuels.

With the increased use of engines which are liquid propelled, such as rocket engines of the type used for missiles or jet engines of the type used for propelling various types of aircraft, it is essential that the fuels for these engines possess various and sundry desired characteristics. For example, the fuels must perform certain functions in each of the essentially three principal functional parts of the rocket engines. These three parts of a typical rocket engine comprise the thrust chamber, the propellant feed system, and the control system. An ideal rocket fuel must therefore be able to function properly in each of the aforementioned parts; for example, the fuel must burn in a stable and efficient manner in the thrust chamber, must burn to form completely gaseous products when a gas generator propellent expulsion system is employed, as well as being able to cool the thrust chamber, must lubricate the pump parts and must operate the control valve. In addition, fuels which are used to operate jet engines on aircraft must have a low freezing point due to the extremely low temperatures at which jet aircraft operate in the upper atmosphere and at the same time must maintain low viscosity and pour points. Therefore, it is necessary to enhance jet fuels or rocket fuels, the two terms for purposes of this invention being used interchangeably and connoting the same fuel. In this respect certain hydrocarbons of particular configuration have been found to possess the aforementioned desirable characteristics and therefore may be used as blending materials whereby jet fuels of improved characteristics may be obtained thereby.

It is known that the heat of combustion of hydrocarbons on the basis of volume tends to increase with increasing density, while the gravimetric heat value of particular hydrocarbons is influenced mainly by the hydrogen content of the molecule. For example, aromatic hydrocarbons have a low gravimetric heat of combustion due to the low hydrogen content of the molecule and, in addition, possess low thermal stability and poor burnability thereby rendering these hydrocarbons relatively unsuitable as fuels for rocket or jet engines. On the other hand, saturated hydrocarbons such as paraffins have a high gravimetric heat of combustion due to the high hydrogen content of the molecule. However, certain of these paraffins are not useable as rocket or jet fuels, specific examples of these being normal paraffins which possess high freezing points in relation to the size of the molecule. As hereinbefore set forth, a low freezing point is a desirable characteristic of a jet or rocket fuel due to the low ambient temperatures in which these particular engines are operated. Another drawback to the use of normal paraffins is that their volumetric heat of combustion is low due to the low density of the molecule. Yet another type of hydrocarbon which is unsuitable for use as this particular type of fuel comprises olefinic hydrocarbons, these compounds being unsuitable because of poor thermal stability.

A particularly suitable type of hydrocarbon which may be used as a component in the preparation of the final fuel or rocket propellent would be hydrogenated methyl indane. These hydrocarbons will possess gravimetric heats of combustion and burning characteristics which closely resemble those of normal paraffins. Furthermore, the high density and specific heat of these compounds are more advantageous in that the greater density of the compounds allows a small volume of fuel to be pumped to the engine thereby consuming less fuel to furnish the energy for pumping.

It is therefore an object of this invention to provide a process for preparing certain hydrocarbons which are useful as blending stocks for jet fuel or rocket propellents.

A further object of this invention is to provide an economical process for preparing methyl indanes which may be thereafter hydrogenated and used as a blending component in the preparation of jet fuels.

In a broad aspect one embodiment of this invention resides in a process for the preparation of methyl indanes which comprises hydrocracking decahydronaphthalene at an elevated temperature at least as high as 460° C. and an elevated pressure in the presence of a hydrocracking catalyst and hydrogen, and recovering the resultant methyl indanes.

A further embodiment of this invention is found in a process for the preparation of methyl indanes which comprises hydrocracking decahydronaphthalene at a temperature in the range of from about 460° to about 600° C. and at a pressure in the range of from about 500 to about 2,000 pounds per square inch in the presence of hydrogen and a hydrocracking catalyst selected from the group consisting of metals and compounds thereof of Groups I–B, VI–B and VIII of the Periodic Table composited on a solid support, and recovering the resultant methyl indanes.

A specific embodiment of this invention is found in a process for the preparation of methyl indanes which comprises hydrocracking decahydronaphthalene at a temperature in the range of from about 460° to about 600° C. and at a pressure in the range of from about 500 to about 2,000 pounds per square inch in the presence of hydrogen and a hydrocracking catalyst comprising potassium amide composited on a promoted alumina support, and recovering the resultant methyl indanes.

Other objects and embodiments will be found in the following further detailed description of this invention.

As hereinbefore set forth, the present invention relates to a process for preparing methyl indanes which may subsequently be hydrogenated and the resulting product used as a blending agent or component in the preparation of jet fuels or rocket propellents which possess the maximum desired characteristics or properties of low freezing point, low viscosity, high gravimetric heat of combustion, etc. The basic material such as indane or indene from which methyl indanes may be prepared is not, at the present time, available in commercial quantities inasmuch as these compounds are usually obtained by the distillation of coal tar. It would therefore be advantageous to the aviation industry in general or to the government, who is a prime user of rocket propellents, to have a process commercially available for the production of methyl indanes which could thereafter be hydrogenated by any method known in the art to prepare compounds which are useful as components in the aforementioned jet fuels or rocket propellents. In this respect it has now been discovered that methyl indanes may be prepared by subjecting decahydronaphthalene to a hydrocracking process in the presence of hydrogen and a hydrocracking catalyst at an elevated temperature and pressure within the ranges hereinafter set forth in greater detail to obtain the desired methyl indanes. The decahydronaphthalene which is utilized as the starting material for this process may be readily available by hydrogenating naphthalene, said naphthalene being available in large amounts, by any method well known in the art.

The desired products which are obtained by the hydrocracking of decahydronaphthalene comprise a mixture of various methyl indanes, the methyl substituent being on either the four-membered ring or the aromatic nucleus of the molecule, said hydrocarbons including 1-methyl indane, 2-methyl indane, 4-methyl indane, and 5-methyl indane.

The catalysts which are employed for the purpose of promoting hydrocracking activity may be generically designated as compositions of matter containing at least one metallic component or compound thereof selected from the metals of Groups I–B, VI–B and VIII of the Periodic Table, the B designation being used for those metals on the left-hand side of the periodic chart of the elements, said metals or compounds thereof being composited on a solid support. The particular solid support which may be used as a carrier material will, in general, comprise a metal oxide or mixture of metal oxides, either naturally occurring or synthetically prepared. Naturally occurring carrier materials include various aluminum silicates, particularly when acid treated to increase the activity thereof; various alumina-containing earths, clays, sands and the like; synthetically prepared carrier materials which generally include at least a portion of both silica and alumina. Other suitable carrier material components which may, in particular instances, by combined in an integral portion of the synthetically prepared carrier material include zirconia, magnesia, boria, titania, etc. A particularly preferred carrier material on which a metal or compound thereof is composited comprises a composite of silica and from about 10% to about 90% by weight of alumina, and still more preferably a composite of silica and from about 25% to about 65% by weight of alumina. The aforementioned carrier material may be prepared in any suitable manner including separate, successive or coprecipitation methods. For example, silica may be prepared by commingling water glass and a mineral acid under such conditions as will precipitate a silica hydrogel. The silica hydrogel is subsequently washed with water containing a small amount of a suitable electrolyte for the purpose of removing sodium ions. The oxides of other compounds, when desired, may be prepared by reacting a basic reagent such as ammonium hydroxide, ammonium carbonate, etc. with an acid salt solution of the metal, as for example, the chloride, sulfate, etc., or by adding an acid to an alkaline salt of the metal such as, for example, commingling sulfuric acid with sodium aluminate, etc. When it is advantageous to prepare the carrier material in the form of particles of uniform size and shape, this may be readily accomplished by grinding the partially dried oxide cake with a suitable lubricant such as stearic acid, resin, graphite, etc., subsequently forming the particles in any suitable pelleting or extrusion apparatus. The preferred carrier material comprises at least two refractory inorganic oxides, and such a composite may be prepared by the separate precipitation method in which the oxides are precipitated separately and then mixed, preferably in the wet state. When successive precipitation methods are employed, the first oxide is precipitated as previously set forth and the wet slurry, either with or without prior washing, is composited with a salt of the other component. Thus, a precipitated, hydrated silica, substantially alkaline free, is suspended in an aqueous solution of aluminum chloride and zirconium chloride following which precipitated, hydrated alumina and precipitated, hydrated zirconia are deposited upon the silica gel by the addition of an alkaline precipitant, such as ammonium hydroxide. The resulting mass of hydrated oxide is water washed, dried and calcined at about 1400° F. Another possible method of manufacture consists of commingling an acid such as hydrochloric acid, sulfuric acid, etc. with commercial water glass under conditions to precipitate silica, washing the precipitate with acidulated water or other means to remove sodium ions, commingling with an aluminum salt such as aluminum chloride and/or some suitable zirconium salt, etc. and either adding a basic precipitant such as ammonium hydroxide to precipitate alumina and/or zirconia, or forming the desired oxide or oxides through the thermal decomposition of the salt as the case may permit. The silica-alumina-zirconia cracking component may be formed by adding the aluminum and/or zirconium salts together or separately. It is understood that the particular means employed for the manufacture of the hydrocracking catalyst is not considered to be a limiting feature of the process of the present invention.

As hereinbefore set forth, one type of carrier material which is used comprises alumina. The alumina may be prepared by adding a reagent such as ammonium hydroxide, ammonium carbonate, etc. to a salt of aluminum such as aluminum chloride, aluminum nitrate, aluminum acetate, etc. in an amount to form aluminum hydroxide. Aluminum chloride is generally preferred as the aluminum salt to be employed, not only for convenience in subsequent washing and filtering procedures, but also it appears to give the best results. The resulting precipitate is, upon drying, converted to alumina. The alumina particles may take the form of any desired shape such as spheres, pills, pellets, cakes, extrudates, powder, granules, etc. A particularly preferred form of alumina is the sphere, and these spheres may be continuously manufactured by passing droplets of an alumina hydrosol into an oil bath which is maintained at an elevated temperature and retaining the droplets in said oil bath until the same set into firm hydrogel spheroids.

When silica and alumina are employed in combination in a manner hereinbefore set forth in the preceding paragraphs, the alumina will usually, as hereinbefore set forth, be present in an amount of from about 10% to about 90% by weight. Thus, the carrier material for the metallic component of the hydrocracking catalyst may comprise one of the following: 88% by weight of silica and 12% by weight of alumina, 75% by weight of silica and 25% by weight of alumina, 88% by weight of alumina and 12% by weight of silica, 63% by weight of alumina and 37% by weight of silica. It is also contemplated within the scope of this invention that the carrier material may also comprise alumina without the addition of silica. The alumina which is used preferably comprises a form which possesses a relatively high surface area within the range of from about 25 to about 500 square meters per gram. Particularly effective forms of alumina include gamma-, eta- and theta-alumina. The aforementioned alumina may be used per se or may be pretreated prior to composition with the metallic component of the catalyst. Such pretreatment includes contact with an alkali metal hydroxide or alkali metal salt followed by drying and calcining of the carrier material whereby the alkali metal oxide acts as a promoter for the carrier material.

Following the formation of the carrier material, the catalytically active metallic components are composited therewith. The catalyst comprises at least one metallic component selected from the metals of Groups I–B, VI–B and VIII of the Periodic Table and includes the platinum-group metals, the iron-group metals, molybdenum, tungsten and chromium, as well as the alkali metals such as sodium, potassium, lithium, etc., the alkali metals being used per se or as compounds thereof such as the amides. These metallic components may be incorporated within the alumina-silica carrier material in any suitable manner. Impregnating techniques may be advantageously employed by first forming an aqueous solution of a water-soluble compound of the desired metal such as platinum chloride, palladium chloride, chloroplatinic acid, chloropalladic acid, ammonia molybdate, nickel nitrate hexahydrate, tungsten chloride, dinitrito-diamino platinum, etc. and commingling the resulting solution with the alumina-silica in a steam drier. Other suitable metal-containing solutions which may be employed are colloidal solutions or suspensions including the desired metal cyanides, metal hydroxides, metal oxides, metal sulfides, etc. Where these solutions are not water soluble at the temperature employed, other suitable solvents such as alcohols, ethers, etc. may be utilized. The final catalytic composite, after all of the catalytic components are present therein, is dried for a period of from about two to about eight hours or more and subsequently oxidized in an oxidizing atmosphere such as air at an elevated temperature of about 1100° to about 1700° F. for a period of from about one to about eight hours or more. Following the high-temperature oxidation procedure, the catalyst may be reduced for a period ranging from about one-half hour to about one hour in the presence of hydrogen at a temperature within the range of from about 700° to about 1000° F. Where convenient, the catalyst may be reduced in situ, that is, by placing the catalyst in the reaction zone, subjecting the same to an imposed hydrogen purge of the system at a temperature of about 700° F.

The total quantity of metallic components of the catalyst disposed in the reaction zone is within the range of from about 0.01% to about 20.0% by weight of the total catalyst. The Group VI-B metal, such as chromium, molybdenum or tungsten, is usually present within the range of from about 4.0 % to about 30.0% by weight of the catalyst. The Group VIII metals, which may be divided into two sub-groups, are present in an amount of from about 0.01% to about 10.0% by weight of the total catalyst. When an iron sub-group metal such as iron, cobalt or nickel is employed, it is present in an amount of from about 0.2% to about 10.0% by weight, while, if a platinum-group metal such as platinum, palladium, iridium, etc. is employed, it is present in an amount within the range of from about 0.01% to about 5.0% by weight of the total catalyst.

Another type of catalyst which may be used as a composition of matter which possesses hydrocracking activity comprises an alkali metal or compound thereof composited on a promoted metal oxide support. A specific example of this type of catalyst comprises a solid carrier which has been promoted by the addition of lithium nitrate and thereafter calcined at a temperature of about 500° C. for a period of about two hours, the final amount of lithium on the carrier being about 5%. This promoted alumina support is then composited with potassium amide, said amide being added to the support by impregnating said support with a solution of potassium dissolved in liquid ammonia. The excess ammonia is evaporated and the catalyst composite is then dried and calcined.

The hydrocracking of the decahydronaphthalene is effected at conditions which include an elevated temperature and pressure. To obtain the desired methyl indanes, the temperature should be at least as high as 460° C. and is preferably in a range of from about 460° up to about 600° C. The pressure which is used will be in the range of from about 500 to about 2,000 pounds per square inch and is usually effected by the addition of hydrogen to the reaction zone. In addition, the reaction will also be effected at a liquid hourly space velocity (the amount of feed stock charged per amount of catalyst per hour) in the range of from about 0.1 up to about 10 or more, the preferred range being from about 1 to about 3.

In order to obtain the desired product, that is, methyl indanes, it was unexpectedly found that temperatures of at least 460° C. were required. When temperatures lower than the minimum temperature were used, a lesser amount of methyl indanes were formed, with a correspondingly greater amount of alkyl substituted cyclohexanes being obtained. Therefore, it is necessary that the hydrocracking of decahydronaphthalene in the presence of certain hydrocracking catalysts be effected at relatively high temperatures with the minimum temperature being 460° C. in order to obtain methyl indanes. When utilizing these specific conditions of temperature, pressure and space velocity a greater than theoretical yield of methyl indanes will be obtained.

The process of the present invention may be effected in any suitable manner and may comprise either a batch or continuous type of operation. For example, when a batch type operation is used, the particular hydrocracking catalyst is positioned in a reaction zone which is provided with heating means whereby the zone is heated to a temperature at least as high as 460° C. The decahydronaphthalene is charged thereto along with the necessary amount of hydrogen to maintain a predetermined pressure. The reactor effluent is collected in a high pressure receiver where said effluent will separate into a liquid and a gaseous phase. The gas is vented, the liquid is collected and the desired methyl indanes are recovered by conventional means such as fractional distillation, etc.

The process of this invention may also be effected in a continuous type operation. When such an operation is used, the hydrocracking catalyst is positioned in a reaction zone which is maintained at the proper operating conditions of temperature and pressure, said temperature being at least as high as 460° C. The decahydronaphthalene charge stock is continuously charged to the reactor while hydrogen is pressed in through separate means. The reactor effluent is continuously withdrawn, separated from unreacted starting materials and subjected to recovery means such as fractional distillation to effect a separation and recovery of the desired products. The unreacted starting materials which have been separated from the reaction product are, meanwhile, returned to the reaction zone to form a portion of the feed stock. Due to the particular nature of the hydrocracking catalyst, a particularly applicable continuous type of operation which may be used comprises a fixed bed type of operation in which the catalyst is positioned as a fixed bed in the reaction zone and the decahydronaphthalene charge stock is passed through said catalyst bed in either an upward or downward flow. Other continuous types of operations which may be used include the moving bed type of operation in which a catalyst bed and a charge stock move through the reaction zone either concurrently or countercurrently to each other and the slurry type process in which the catalyst is carried into the reaction zone as a slurry in the decahydronaphthalene charge stock.

The following examples are given to illustrate the process of the present invention which, however, are not intended to limit the generally broad scope of the present invention in strict accordance therewith.

*Example I*

In this example a reactor of stainless steel tubing equipped with an electric furnace was charged with 200 cc. of a hydrocracking catalyst comprising about 2% nickel and about 17% molybdenum composited on a support consisting of 63% alumina and 37% silica. The catalyst was presulfided in situ for two hours at a temperature of about 400° C. with a 9:1 mixture of hydrogen:hydrogen sulfide. The charge stock of decahydronaphthalene and hydrogen were charged to the reactor downflow over the catalyst bed. The product or effluent, after leaving the reactor, was charged to a high pressure receiver and after leaving the high pressure receiver was fed to a debutanizer column where light ends were stripped by nitrogen. The liquid effluent was run through a gas chromatograph to separate the feed stock and to determine the amounts of cracked products. Following this, the aromatic fractions were separated and thereafter subjected to fractional distillation under reduced pressure. The distillation cuts were then identified by infra-red analysis. The reactor was maintained at a temperature of about 480° C. and at a pressure of 1,500 pounds per square inch, while the feed stock was charged thereto at a liquid hourly space velocity of 2.0. Analyses of the liquid product recovered from this run disclosed an ultimate yield of 23.7% of a mixture of 1- and 2-methyl indanes, 8.96% of 4-methyl indane and 7.68% of 5-methyl indane.

When repeating the above experiment under similar conditions, the only variable being that the feed stock was charged to the reactor at a liquid hourly space velocity of 1.0, all other conditions being equal, analyses of the liquid products obtained disclosed the presence of 10.01% of a mixture of 1- and 2-methyl indanes, 9.15% of 4-methyl indane and 8.15% of 5-methyl indane.

*Example II*

In this example a reactor was loaded with 200 cc. of a catalyst similar to that described in Example I above. The reactor was heated to a temperature of 520° C. and a pressure of 1,500 pounds per square inch. Decahydronaphthalene was charged thereto at a liquid hourly space velocity of 3.0. The reactor effluent was treated in a manner similar to that hereinbefore set forth and analyses of the product disclosed an ultimate yield of 11.5% of a mixture of 1- and 2-methyl indanes and 33.6% of a mixture of 4- and 5-methyl indanes.

When decahydronaphthalene was charged to a reactor at a liquid hourly space velocity of 2.0, all other operating conditions of temperature and pressure being the same, the final product analyzed an ultimate yield of 13.3% of a mixture of 1- and 2-methyl indanes, 7.57% of 4-methyl indane and 20.2% of 5-methyl indane.

The above experiment was repeated utilizing a hydrocracking catalyst of a nickel-molybdenum mixture composited on an alumina-silica support of similar proportion to that set forth in Example I above. The reactor was maintained at a temperature of 540° C. and a pressure of 1,500 pounds per square inch, the decahydronaphthalene being charged at a liquid hourly space velocity of 2.0. Analyses of the final product disclosed an ultimate yield of 13.2% of a mixture of 1- and 2-methyl indanes, 7.47% of 4-methyl indane and 22.0% of 5-methyl indane.

When the decahydronaphthalene was charged to the reactor which was maintained at a temperature of 540° C., a pressure of 1,500 pounds per square inch and a liquid hourly space velocity of 3.0, the final products analyzed as an ultimate yield of 12.2% of a mixture of 1- and 2-methyl indanes, 26.1% of 4-methyl indane and 6.85% of 5-methyl indane.

*Example III*

In this example a reactor comprising a stainless steel tubing similar in nature to that utilized in the above examples is loaded with 200 cc. of a catalyst comprising about 15.7% chromia impregnated on a promoted alumina support. The feed stock of decahydronaphthalene is pumped downflow over the catalyst bed along with a sufficient amount of hydrogen to maintain a pressure of 1,500 pounds per square inch. The reactor is maintained at a temperature of about 480° C., while the decahydronaphthalene is charged at a liquid hourly space velocity of 2.0. The reactor effluent is recovered in a high pressure receiver and is thereafter treated in a manner similar to that set forth in Example I above. Analyses of the liquid product will disclose the presence of a substantial portion of 1-methyl indane, 2-methyl indane, 4-methyl indane and 5-methyl indane.

*Example IV*

A reactor similar in nature to that hereinbefore set forth in the above examples is loaded with 200 cc. of a catalyst comprising potassium amide composited on an alumina support which has been pretreated with lithium nitrate. The reactor is maintained at a temperature of about 540° C. and a pressure of about 1,500 pounds per square inch. The decahydronaphthalene feed stock is charged to the reactor at a liquid hourly space velocity of about 2.0. Upon completion of the residence time, the reactor effluent is passed through a high pressure receiver, after which the liquid portion of the effluent is recovered and subjected to treatment similar in nature to that hereinbefore set forth. Analyses of the liquid product will disclose the presence of a mixture of 1-methyl indane, 2-methyl indane, 4-methyl indane and 5-methyl indane.

I claim as my invention:

1. A process for the preparation of methyl indanes which comprises hydrocracking decahydronaphthalene at an elevated temperature at least as high as 460° C. and an elevated pressure in the presence of a hydrocracking catalyst and hydrogen, and recovering the resultant methyl indanes.

2. A process for the preparation of methyl indanes which comprises hydrocracking decahydronaphthalene at a temperature in the range of from about 460° to about 600° C. and at a pressure in the range of from about 500 to about 2,000 pounds per square inch in the presence of a hydrocracking catalyst and hydrogen, and recovering the resultant methyl indanes.

3. A process for the preparation of methyl indanes which comprises hydrocracking decahydronaphthalene at a temperature in the range of from about 460° to about 600° C. and at a pressure in the range of from about 500 to about 2,000 pounds per square inch in the presence of hydrogen and a hydrocracking catalyst selected from the group consisting of metals and compounds thereof of Groups I–B, VI–B and VIII of the Periodic Table composited on a solid support, and recovering the resultant methyl indanes.

4. A process for the preparation of methyl indanes which comprises hydrocracking decahydronaphthalene at a temperature in the range of from about 460° to about 600° C. and at a pressure in the range of from about 500 to about 2,000 pounds per square inch in the presence of hydrogen and a hydrocracking catalyst comprising a nickel-molybdenum mixture composited on a solid support, and recovering the resultant methyl indanes.

5. A process for the preparation of methyl indanes which comprises hydrocracking decahydronaphthalene at a temperature in the range of from about 460° to about 600° C. and at a pressure in the range of from about 500 to about 2,000 pounds per square inch in the presence of hydrogen and a hydrocracking catalyst comprising a nickel-molybdenum mixture composited on a silica-alumina support, and recovering the resultant methyl indanes.

6. A process for the preparation of methyl indanes which comprises hydrocracking decahydronaphthalene at a temperature in the range of from about 460° to about 600° C. and at a pressure in the range of from about 500 to about 2,000 pounds per square inch in the presence of hydrogen and a hydrocracking catalyst comprising chromia composited on a promoted alumina support, and recovering the resultant methyl indanes.

7. A process for the preparation of methyl indanes which comprises hydrocracking decahydronaphthalene at a temperature in the range of from about 460° to about 600° C. and at a pressure in the range of from about 500 to about 2,000 pounds per square inch in the presence of hydrogen and a hydrocracking catalyst comprising potassium amide composited on a promoted alumina support, and recovering the resultant methyl indanes.

References Cited by the Examiner

UNITED STATES PATENTS 2,942,041   6/1960   Pitts et al. _____ 260—668

DELBERT E. GANTZ, *Primary Examiner.*

C. R. DAVIS, *Assistant Examiner.*